United States Patent [19]

Grosjean

[11] Patent Number: 4,868,051

[45] Date of Patent: Sep. 19, 1989

[54] ADHESIVE COMPOSITE POLYESTER FILMS

[75] Inventor: Pierre Grosjean, Sainte-Foy Les Lyon, France

[73] Assignee: Rhone-Poulenc Films, Courbevoie, France

[21] Appl. No.: 105,019

[22] Filed: Oct. 6, 1987

[30] Foreign Application Priority Data

Oct. 6, 1986 [FR] France ................. 86 13978

[51] Int. Cl.$^4$ ............................................. B32B 27/00
[52] U.S. Cl. ..................................... 428/336; 428/480; 428/482; 428/325; 428/331; 525/437; 525/439
[58] Field of Search ............... 428/352, 353, 354, 480, 428/482, 336

[56] References Cited

U.S. PATENT DOCUMENTS

| | | | |
|---|---|---|---|
| 4,011,358 | 3/1977 | Roelofs | 428/354 |
| 4,065,439 | 12/1977 | Uno et al. | 428/480 |
| 4,493,872 | 1/1985 | Funderburk et al. | 428/480 |
| 4,585,687 | 4/1986 | Posey et al. | 428/480 |

*Primary Examiner*—George F. Lesmes
*Assistant Examiner*—Alisa A. Harbin
*Attorney, Agent, or Firm*—Burns, Doane, Swecker & Mathis

[57] ABSTRACT

Oriented composite polyester films, to which a wide variety of final application topcoatings are improvedly adherent, e.g., matte, photosensitive and magnetic topcoatings, comprise an oriented base film substrate (A) of a crystalline or semicrystalline polyester, the base film substrate (A) bearing an adhesion primer coating (B) on at least one of the face surfaces thereof, and the adhesion primer coating (B) comprising:

(a) a crystalline, semicrystalline or crystallizable polyester;
(b) a water-sensitive copolyster; and
(c) an organic solvent-sensitive polyester or copolyester.

24 Claims, No Drawings

ADHESIVE COMPOSITE POLYESTER FILMS

BACKGROUND OF THE INVENTION

1. Field of the Invention

The present invention relates to oriented composite polyester films exhibiting, in particular, improved adhesiveness relative to a wide variety of final application topcoatings.

By the expression "final application coatings", as utilized herein, are intended coatings which impart to the oriented polyester base films properties permitting extremely diverse industrial applications, which are well known to this art.

2. Description of the Prior Art

Thus, it is known that, for a number of industrial applications, polyester films cannot be employed directly, but only after the deposition of a topcoating matched to each particular end use. Exemplary of such applications, representative are matte coatings for hand drawing or for tracing tables, photosensitive coatings and photographic applications, diazo coatings for microfilm, printing plans or reprography applications, print coatings, magnetic coatings for recording various data (sound, images, data processing), metallic coatings, and coatings which modify the gas-permeability properties of polyester films used as packaging materials.

It is also known to this art that, normally, the bonding of final application topcoatings to a face surface of a polyester film is not easy. In fact, polyester films have a relatively smooth surface and have limited chemical reactivity and very low sensitivity to solvents. In most cases, therefore, it is necessary to first apply an "adhesion primer" coating, enabling the final use layers to be anchored thereto, according to more or less complex chemical formulations. As a general rule, this adhesion primer (or anchor coat) is applied by the converter. It is thus easy for the latter to adapt the nature of the primer to the end application intended.

Film manufacturers themselves have attempted to modify the surface of the films by various means. The use of polymers of various kinds as adhesion primers has been proposed to the art for this purpose. In most cases, acrylic polymers or copolymers are used, which are preferably employed in latex form, or modified copolyesters are used, particularly copolyesters characterized by the presence of hydrophilic groups and in particular of sulfonyloxy groups (hydroxysulfonyl groups or their metal salts) in their structure. The process of coating polyester films with copolyesters containing sulfonyloxy groups (sulfonated copolyesters) depends on the more or less pronounced hydrophilic nature of the polyester, which itself is related to the sulfonyloxy group content. Thus, when this content is sufficiently high for the copolyester to be soluble or capable of being dispersed in water, the overcoat is produced by coating the polyester film with an aqueous solution or dispersion (cf. French Pat. Nos. 1,401,581 and 1,602,002, U.S. Pat. No. 4,476,189, European Pat. No. 78,559). When the sulfonated copolyester is incapable of being dispersed (not soluble or dispersible) in water, it is preferable to effect deposition by coextrusion of a conventional polyester and a sulfonated copolyester (cf. Japanese Patent Applications published under Nos. 50/134,086 and 54/153,883). The industry is moving towards the use of polyester films with adhesion primers for a wide spectrum of uses and adapted to meet the various needs of the ultimate converters. The production of films of this type has not proven feasible to date using the adhesion primers heretofore known to the art.

SUMMARY OF THE INVENTION

Accordingly, a major object of the present invention is the provision of improved composite polyester films well adapted to receive a wide variety of final application coatings, whether hydrophilic or organophilic in nature, and to so receive such ultimate topcoatings without adversely affecting the other properties required of the polyester films, especially machinability. It will be appreciated that it is important, in particular, that the adhesion primer does not promote any film blocking phenomena at conversion and/or storage temperatures. Lastly, it is equally important that the polyester comprising the adhesion primer may be recycled to the stage of extrusion of virgin polyester without thereby appreciably modifying the properties of the films produced from such mixtures. Indeed, it is current practice to recover the polyester from the wastes associated with film manufacture. To reiterate, the present invention provides novel composite oriented polyester films having enhanced adhesiveness relative to various final application coatings, which do not exhibit blocking at conversion and/or storage temperatures, and the waste materials from which can be readily recycled to the stage of extrusion of the conventional base polyester without appreciably modifying the properties of the final product films.

Briefly, the present invention features oriented composite polyester films having improved adhesiveness relative to the final application topcoatings, which comprise a base film (A) of a crystalline or semicrystalline polyester having a contiguous layer of an adhesion primer overcoating (B) based on a water-sensitive copolyester on at least one of the face surfaces thereof, said layer (B) comprising a ternary mixture of:

(a) a crystalline, semicrystalline or crystallizable polyester,
(b) a water-sensitive copolyester, and
(c) a polyester or copolyester which is sensitive to organic solvents.

DETAILED DESCRIPTION OF THE PREFERRED EMBODIMENTS OF THE INVENTION

By the term "crystallizable polyester", as utilized herein, are intended those polyesters or copolyesters which, after extrusion in the molten state through a die, followed by drawing of the amorphous polymer, produce crystalline or semicrystalline polyesters or copolyesters. Polymer crystallinity is determined by the usual means which are well known to this art, such as X-ray diffraction, differential thermal analysis (cf. S. H. Lin et al., *J. Polymer Sci. Polymer Symposium*, 71, 121–135 [1984]) and the density test.

The crystalline or crystallizable polyesters employed for the production of the base layer (A) and as component (a) of the ternary mixture of the adhesion primer layer (B) are those polyesters and copolyesters which are typically employed for the production of polyester films oriented by drawing and having a crystalline or semicrystalline structure. These polyesters are characterized by their hydrophobic nature and relative insensitivity to industrial organic solvents such as esters, ketones or halogenated, and especially chlorinated, hydrocarbons. More particularly, the crystalline or crystallizable polyesters employed as component (a) of the ternary mixture advantageously have a solubility volume below $10^{-2}$ (cal/cm$^3$)$^{3/2}$. The definition of "solubility volume" is as defined by C. Hansen in *J. Paint Technology*, 39, No. 505, p. 104, and No. 511, p. 505 and 511 (1967).

The crystalline, semicrystalline or crystallizable polyesters employed for the production of the base layer (A) and as component (a) of the ternary mixture may be any film-forming polyester prepared from one or more dicarboxylic acid(s) or from the lower alkyl esters thereof, (terephthalic acid, isophthalic acid, 2,5-naphthalenedicarboxylic acid, 2,6-naphthalenedicarboxylic acid, 2,7-naphthalenedicarboxylic acid, succinic acid, sebacic acid, adipic acid, azelaic acid, diphenyldicarboxylic acid and hexahydroterephthalic acid) and from one or more diols or polyols such as ethylene glycol, 1,3-propanediol, 1,4-butanediol, neopentylglycol and 1,4-cyclohexanedimethanol, and polyoxyalkylene glycols (polyoxyethylene glycol, polyoxypropylene glycol or random or block copolymers thereof). When copolymers are used, they should contain a sufficient proportion of the monomer component(s) that imparts crystallinity thereto. It is preferable to use homopolyesters and copolyesters derived from terephthalic acid. In the case of copolyesters, these preferably comprise a proportion of terephthalate recurring units representing at least 80 mole %, and more preferably at, least 90%, of the diacid recurring units. The polyesters and copolyesters derived from ethylene glycol and from 1,4-butanediol constitute a preferred class of polymers employed for the production of the base layer (A) and as component (a) of the ternary mixture of the adhesion primer comprising the layer (B). It is not essential in carrying out this invention for the crystalline (crystallizable) polymers employed for the layer (A) and for the layer (B) to be identical. Advantageously, the polyester is a polyethylene terephthalate, the intrinsic viscosity of which, measured in o-chlorophenol at 25° C., ranges from 0.6 to 0.75 dl/g.

The water-sensitive (or hydrophilic) copolyesters employed as component (b) of the layer (B) of the composite films according to the present invention impart to such layer an affinity for water and for the aqueous or hydroorganic compositions of the final coatings. By "water-sensitive copolyesters" are intended polymers which, at ordinary temperatures, exhibit at least a slight visible reaction (swelling, cloudiness, gel, solubility) towards water. Such polymers are preferably copolyesters containing hydrophilic groups in their polymer chain. Although these hydrophilic groups may vary in their nature, free acidic groups, or the metal or ammonium salts thereof, are preferably incorporated. More specifically, copolyesters are preferably employed which comprise a plurality of hydroxysulfonyl groups, or of metal or ammonium salts thereof, all of these being circumscribed by the expression "oxysulfonyl groups" as utilized hereinafter.

More preferably, as the component (b) of the primer (B), copolyesters are employed which contain a plurality of oxysulfonyl groups of the general formula:

$$(-SO_3)_nM \quad (I)$$

in which:
n is equal to 1 or 2; and
M is a hydrogen atom, an alkali metal (for example, sodium or potassium), an alkaline earth metal (calcium, barium), an ammonium cation, or a quaternary ammonium cation.

The copolyesters comprising oxysulfonyl functions are known polymers; such copolyesters have been described, in particular, in French Pat. Nos. 1,401,581 and 1,602,002, mentioned above. These copolyesters may be produced by polycondensation of at least one or more aromatic dicarboxylic acids with at least one or more aliphatic diols and at least one difunctional compound containing at least one oxysulfonyl group. The difunctional compounds containing an oxysulfonyl group may be dicarboxylic acids or diols, such as those noted in French Pat. No. 1,602,002 or U.S. Pat. No. 3,779,993. The oxysulfonyl groups are preferably bonded to an aromatic radical.

Among the difunctional compounds containing oxysulfonyl groups, more preferably employed are those aromatic acids of the general formula:

(II)

in which:
M and n are as defined above;
Z is a polyvalent aromatic radical;
X and Y are hydroxycarbonyl radicals or derivatives thereof, e.g., esters of lower aliphatic alcohols or acid halides (chloride, bromide); and
p is an integer equal to 1 or 2.

In the formula (II), Z is preferably a phenyl radical or a combination of two or more than two ortho- or peri-condensed phenyl radicals or of two or more phenyl groups linked together by means of inert moieties such as alkylene (for example, methylene, ethylene or propylene) or alkylidene (e.g., propylidene) radicals or ether, ketone or sulfone groups.

Exemplary acids which are representative dicarboxylic acids containing oxysulfonyl groups are: hydroxysulfonylterephthalic, hydroxysulfonylisophthalic (in particular 5-sulfoisophthalic acid), hydroxysulfonylorthophthalic, 4-hydroxysulfonyl-2,7-naphthalenedicarboxylic, hydroxysulfonyldiphenyl-4,4'-dicarboxylic, hydroxysulfonyl- 4,4'-dihydroxycarbonyldiphenylsulfones, hydroxysulfonyl-4,4'-dihydroxycarbonyldiphenylmethanes, 5-(hydroxysulfonylphenoxy)isophthalic acid and 5-(hydroxysulfonylpropoxy)isophthalic acid. Hydrophilic copolyesters produced from hydroxysulfonyl isophthalic acids are very particularly suitable for the preparation of the composite films according to the invention.

The unsulfonated dicarboxylic acids which are used to prepare the copolyesters containing hydrophilic groups are those typically employed in the production of polyesters. In this regard, exemplary are terephthalic, isophthalic, phthalic, 2,5-naphthalenedicarboxylic and 2,6-naphthalenedicarboxylic acids, 4,4'-dihydroxycarbonyldiphenylsulfone and 4,4'-dihydroxycarbonyldiphenyl ether. These acids may be employed either by themselves or mixed with each other or with saturated aliphatic dicarboxylic acids such as adipic, succinic or sebacic acids. Terephthalic and isophthalic acids are preferably used, more particularly mixtures of these two acids.

Exemplary of the diols which ma be used for preparing the copolyesters containing hydrophilic groups, representative are ethylene glycol, propylene glycol, 1,3-butanediol, 1,4-butanediol, 2,2-dimethyl-1,3-propanediol, 1,5-pentanediol, 1,6-hexanediol, cyclohexanedimethanol, diethylene glycol, and tri-, tetra-, penta- and hexaethylene glycols. Ethylene glycol and its oligomers are very particularly suitable. They may be employed either by themselves or mixed with each other and/or with other diols. Mixtures of ethylene glycol and its oligomers having the formula HO—(CH$_2$—CH$_2$—O)$_m$—H, in which m is an integer ranging from 2 to 10, are preferred. In this latter case, the oligomer content of the ethylene glycol, expressed as a weight percentage of the sulfonated polyester, is preferably at least 2% and does not exceed 30%. A proportion of between 5 and 25% by weight is suitable.

The content of recurring oxysulfonyl group units in the hydrophilic copolyesters may vary over wide limits. This content, expressed in relation to the total number of recurring units of like nature (diacid or diol), preferably ranges from 5 to 20%. Thus, when a dicarboxylic acid containing oxysulfonyl groups is used, the number of recurring units derived from the latter constitutes from 5 to 20% of the total number of recurring units derived from the different dicarboxylic acids.

Among the copolyesters containing oxysulfonyl groups which are employed as component (b) of the primer (B), preferred are those whose chain contains a plurality of terephthalate 5-oxysulfonylisophthalate recurring units, isophthalate if desired, and a plurality of recurring units derived from ethylene glycol and/or oligomers thereof. It is advantageous to employ copolyesters in which the number of 5-oxysulfonylisophthalate recurring units constitutes from 5 to 20% of the total number of recurring units derived from dicarboxylic acids. When the copolyesters contain both terpphthalate and isophthalate recurring units, the latter preferably constitute not more than 70% of the terephthalate/isophthalate total. A number of isophthalate recurring units ranging from 5 to 70% of this total is suitable.

The copolyesters containing hydrophilic groups described earlier may be prepared by known conventional methods. It is thus possible to react, in a first step, the diol or the diols with a methyl ester of the carboxylic acid or acids, with either reactant group containing the difunctional compound containing the hydrophilic group(s), in order to produce the esters of the corresponding diols by transesterification in the presence of the usual catalysts and then, in a second step, to carry out polycondensation in known manner. According to another method, two prepolycondensates may be prepared, one of which comprises the recurring units containing the hydrophilic groups and these may be reacted, in the presence of the usual catalysts, until a copolyester of higher molecular weight is produced. The copolyester containing hydrophilic groups may also be a block copolyester or a random copolyester.

The polyesters which are sensitive to organic solvents (or organophilic polyesters) employed as component (c) of the ternary mixture are polymers which exhibit at least a slight visible reaction (swelling, cloudiness, gel), at ordinary temperatures, when contacted with organic solvents comprising, e.g., ester, ketone or halogenated hydrocarbon groups. The organophilic polyesters preferably have a solubility volume greater than $10^{-2}$ (cal/cm$^3$)$^{3/2}$ and more preferably a solubility volume greater than $10^{-1}$ (cal/cm$^3$)$^{3/2}$.

The organophilic polyesters which may be employed include homopolyesters or copolyesters which are preferably not crystallized and noncrystallizable, containing recurring units which introduce the sensitivity to the conventional solvents of the abovementioned groups and in particular towards solvents such as acetone, methyl ethyl ketone, ethyl acetate and dichloroethane.

The organophilic polyesters may be produced from one or more aliphatic and/or aromatic dicarboxylic acids and one or more aliphatic diols which are suitably selected such as to impart to the final polymers an adequate sensitivity to the solvents of the foregoing type.

Exemplary of the acids which may be employed to prepare the organophilic polyesters, representative are aromatic diacids such as terephthalic, isophthalic, phthalic and 2,6-naphthalenedicarboxylic acids and aliphatic or alicyclic diacids such as adipic, succinic, sebacic, 1,10-decanedicarboxylic and 1,4-cyclohexanedicarboxylic acids.

Exemplary of the diols which may be employed, representative are ethylene glycol and oligomers thereof (diethylene glycol, triethylene glycol, tetraethylene glycol), propylene glycol, 1,4-butanediol, 1,4-pentanediol, 1,6-hexanediol, 1,10-decanediol, cyclohexanedimethanol and neopentyl glycol.

The organophilic polyesters may be homopolymers or copolymers, provided that the difunctional compounds comprising the polymer chains thereof are capable of imparting the solvent sensitivity such as defined above and, in particular, a solubility volume greater than $10^{-2}$ (cal/cm$^3$)$^{3/2}$. Indeed, aliphatic hydrocarbon recurring units must be introduced into the polyester chain in sufficient quantity to form polyesters which are sensitive to solvents. Thus, polyethylene terephthalate or the crystalline or crystallizable copolyesters derived from terephthalic acid, aromatic diacids and ethylene glycol and/or from oligomers thereof cannot be used as the solvent-sensitive polyesters within the ambit of the present invention. When copolyesters derived from terephthalic acid and ethylene glycol and/or oligomers thereof are employed as organophilic polyesters, the said copolyesters must contain a proportion of recurring units derived from other aromatic (for example, isophthalic) and/or aliphatic (adipic acid) acids and/or diols other than ethylene glycol and its oligomers and, in particular, alkylene diols whose alkylene moiety contains a number of carbon atoms which is greater than or equal to 3 (for example, butanediol, neopentyl glycol or bishydroxymethylcyclohexane) and which is sufficient to impart the solvent-sensitivity consistent herewith. The proportion of these recurring units obviously depends on their nature and is determined for each individual case.

Although any homopolyester or copolyester which is organophilic within the meaning of the invention may be used, copolyesters containing ethylene terephthalate recurring units and a proportion of recurring units derived from other diacids and/or other diols, sufficient to impart the solvent-sensitivity and, in particular, a solubility volume greater than $10^{-2}$ (cal/cm$^3$)$^{3/2}$, constitute a preferred class of organophilic copolyesters employed as component (c) of the adhesion primer. Representative in this respect are the copolyesters derived from terephthalic acid, ethylene glycol and cyclohexanedimethanol or from terephthalic acid, isophthalic acid, ethylene glycol and neopentyl glycol.

The weight proportions of the components (a), (b) and (c) in the ternary mixture defining the primer (B)

may vary over wide limits, depending on the nature of the components (b) and (c) and according to whether it is intended to promote adhesiveness to aqueous or organic final coatings. Advantageously, the proportions of the three components of the ternary mixture are in the following ranges:

(a) from 30 to 65% by weight of the mixture,
(b) from 15 to 60% by weight of the mixture,
(c) from 10 to 55% by weight of the mixture, and, more preferably, are in the following ranges:

(a) from 35 to 60%,
(b) from 20 to 55%, and
(c) from 10 to 50%.

The layers (A) and/or (B) of the composite films of the invention may contain fine particles for the purpose of modifying the surface roughness of the layer containing same, by imparting good slip properties thereto.

Such fillers may be fine particles introduced into the polymeric composition and/or may be particles originating from catalyst residues or precipitation aids. The roughness is preferably effected by the addition of fine inert particles to the polymeric composition.

The quantities of the particles present ar such that the overall layer contains from 0.05 to 1% and preferably from 0.02 to 0.5% by weight thereof. The median volume diameter of these particles typically ranges from 0.1 to 5 microns and preferably from 0.2 to 3 microns.

The nature of the inert particles which are added may vary very widely: they may be inorganic particles (oxides or salts of elements of Groups II, III and IV of the Periodic Table), or else polymeric particles. Exemplary of the fillers which can thus be employed, representative are: silica, silicoaluminates, calcium carbonate, MgO, $Al_2O_3$, $BsSO_4$ and $TiO_2$. It is of course possible to use a mixture of several fillers.

When the layer (B) contains particles in a finely divided state, the latter may be introduced with any one or more of the polyesters of the mixture. They may be fine particles introduced into the polymeric composition and/or particles formed by precipitation of catalyst residues or precipitation aids.

In an alternative embodiment of the present invention, the layers (A) and/or (B) may additionally contain various additives typically employed in the film industry such as, for example, heat stabilizers which permit the film to be recycled.

The composite films according to the present invention may comprise a single layer (B) or two layers (B) (a layer B on each face surface of the base layer A). In this case, the layers (B) may be identical or different. The layers (B) may then differ in the nature of the polyesters (a), (b) and (c) constituting the ternary mixture and/or the proportions of (a), (b) and (c) in the mixture, and/or the presence or absence of fillers and/or the proportion of filler, and/or, yet again, in their thickness.

The crystalline, semicrystalline or crystallizable polyester (a) employed as a component of the ternary mixture may be identical to or different from the crystalline, semicrystalline or crystallizable polyester defining the layer (A). This difference may be in the nature of the polyester and/or in the presence of a filler in either of the polyesters and/or in the filler content of each of the polyesters and/or in the particle size distribution of the fillers and/or in the nature of the fillers. Thus, for example, the polyester forming the layer (A) may be polyethylene terephthalate and the component (a) of the ternary mixture a crystalline or crystallizable ethylene terephthalate/isophthalate copolyester containing less than 20 mole % of isophthalate recurring units, or else the polyester forming the layer (A) is an unfilled polyethylene terephthalate and the component (a) of the ternary mixture is the same polyester containing a filler.

When the composite films according to the invention comprise only one layer (B), the other face surface of the layer (A) may comprise a layer (C) which differs from the layers (A) and (B). The layer (C) may differ from layer (A) in the nature of the polyester of which it is formed and/or the presence of fillers in either layer and/or the nature and/or the particle size distribution and/or the proportion of these fillers. This provides a convenient means for modifying the surface properties (topography) of the face surface of the composite film according to the invention opposite from that bearing the layer (B). It is then possible to vary its roughness, coefficient of friction and abrasion resistance, depending upon the intended end use of the film.

The composite films of the present invention may be produced by various conventional processes. They are advantageously produced by coextrusion, by feeding a first linear die with a film-forming polyester which is amorphous . and which becomes crystalline or semi-crystalline after being subjected to a drawing or stretching treatment, followed by heat setting, while the ternary mixture is simultaneously extruded through at least one second die arranged parallel to the first and immediately contiguous therewith.

The ternary mixture may be formulated by means of any known single-stage or multistage mixing and blending technique. It may be prepared directly, immediately before its extrusion, by melting its components at a high temperature, or it may have been formulated beforehand, extruded and packaged as a granulate and remelted after dilution, if desired, with crystalline, semicrystalline or crystallizable polyester granules.

The conditions for the formulation and extrusion of the ternary mixture are selected such as to avoid a change in this mixture towards the formation of block, or even random polymers, such that the properties specific to each component of the mixture (for example crystallinity) would be greatly modified or would disappear In particular, the residence time of the mixture in the extruder which effects the mixing of the components and the extrusion is maintained sufficiently short as not to cause any major modification of the polymers.

The conditions of drawing of the extruded composite film are those typically employed in the production of polyester films. Thus, a monoaxial or biaxial drawing may be carried out successively or simultaneously in two directions which are generally at right angles, or else in sequences of at least 3 drawing operations where the direction of drawing is changed at each sequence. Furthermore, each monoaxial drawing may itself be carried out in several stages. Drawing sequences may thus be combined such as, for example, two successive biaxial drawing treatments, it being possible for each drawing treatment to be carried out in several stages.

The composite film is preferably subjected to a biaxial drawing operation in two perpendicular directions. It is possible, for example, to carry out a drawing operation in the direction of travel of the film (lengthwise drawing) and then a drawing operation in a perpendicular direction (transverse drawing), or vice versa. In general, the lengthwise drawing is carried out to a ratio of 3 to 5 (that is to say, the length of the drawn film represents from 3 to 5 times the length of the amorphous film) and at a temperature of 80° to 100° C., and the transverse drawing is carried out to a ratio of 3 to 5 at temperature of 90° to 120° C.

The drawing may also be carried out simultaneously, that is to say simultaneously in the lengthwise direction and in the transverse direction, for example with a ratio of 3 to 5 and at a temperature of 80° to 100° C.

Depending on the selection of the drawing conditions, it is possible to generate individual surface topographies such as the presence of cavities surrounding a prominence. This possibility of generating individual topographies also depends on the selection of the polymer and of its adjuvants.

The composite films of the invention may be what have become to be designated thin films, of overall thickness ranging from 5 to 50 microns, or what are designated as thick films, whose thickness usually ranges from 50 to 300 microns. The layer (B) or the layers (B) in these composite films have a thickness which typically ranges from 0.3 microns to 1 microns and preferably from 0.5 microns to 5 microns.

In consideration of the anchoring characteristics thereof, composite films of the present invention may be advantageously used in many fields, or, after coating, they will define films for the graphic arts (matting layer), diazo films for microfilm, films for magnetic tapes, photographic films (silver-containing films) or, yet again, films for printing and combining and intended for packaging.

It will be appreciated that, since the composite films are prepared by coextrusion, it is possible to control the surface roughness by virtue of incorporating fillers which are dispersed in the polymer; a given layer (B) which is optimized for adhesion and is generally unfilled may thus be diversified and adapted to any given marketplace.

Furthermore, in consideration of the composition of the ternary mixture (marked presence of crystalline polyester) and of the respective thicknesses of the layers (A) and (B), it is possible to recycle up to 30 of the mixtures produced by melting the composite film wastes into the polyester forming the layer (A) without prejudice to the quality of the film.

In order to further illustrate the present invention and the advantages thereof, the following specific examples are given, it being understood that same are intended only as illustrative and in nowise limitative. In said examples to follow, the crystalline or crystallizable polyesters are represented as (a), the water-sensitive polyesters as (b) and the organophilic polyesters as (c). The following tests were carried out:

(1) Tests for the water-sensitivity of the polyesters (b) and the solvent-sensitivity of the polyesters (c)

In order to determine the water- or solvent-sensitivity, 0.5 g of polyester is introduced into 5 cm$^3$ of water or of a suitable organic solvent in a glass test tube 1.8 cm in diameter and 10 cm in height and is maintained at 20° C. for one week. It is then noted whether the polyester has dissolved completely or partly in water, or the selected solvent, or whether a gel has formed or a more or less pronounced swelling or any change has taken place.

The reference solvents are those mentioned above: ethyl acetate, acetone, methyl ethyl ketone, dichloroethane and trichloroethylene.

(2) Tests to determine the adhesiveness of the composite film to various types of final application coatings For this purpose, each composite film is coated onto the layer (B) with a final coating by means of manual coating using an apparatus of the tradename "Hand Coater", in which the engraved coating bar is selected in order to deposit 6 g of composition per m$^2$ of film. The coated film is dried in a ventilated oven for 1 minute at 150° C. and is stored for 24 hours before being subjected to the following adhesiveness tests:

Test 3

The composite is coated with a diazo composition for microfilms in which the solvent is acetone.

Test 8

The composite is coated with a matting composition for drawing films, based on crosslinked polyvinyl alcohol in a water/alcohol solvent.

Test 10

The composite is coated with a diazo matting composition for drawing and reprography film, consisting of an alcoholic solution of a cellulose derivative.

Coating stripping tests are carried out on each of the coated films using a adhesive tape of trademark Magic Tape No. 810 from Minnesota Mining & Manufacturing Company. The tape is applied manually and the stripping is carried out under conditions of increasing severity:

(a) slow stripping;
(b) fast stripping;
(c) stripping with previous scoring of the final coating with a razor blade;
(d) stripping with previous creasing of the film.

In each case the stripping resistance is graded from 1 (easy complete stripping) to 10 (perfect behavior of the coating). Lastly, an overall score of from 1 to 10, taking into account the scores awarded for each of the conditions (a) to (d), provides an overall assessment of the stripping resistance of the final coatings for each of the tests 3, 8 and 10.

In the examples hereinafter, the following polyesters were used for the preparation of the composites:

(1) Crystallizable polyester (a):

Reference (a1)

Polyethylene terephthalate having a viscosity 0.62 dl/g measured in ortho-chlorophenol at 25° C.

(2) Water-sensitive copolyester (b)

Reference (b1)

This was a material marketed by Rhine-Poulenc Specialites Chimiques under the trademark Gerol PS 20 40/60.

It was a terephthalic acid/isophthalic acid/5-sulfoisophthalic acid/diethylene glycol copolyester containing:

(i) 15 mole % of 5-sulfoisophthalic acid based on the total acids;
(ii) 40 mole % of terephthalic acid based on the total terephthalic acid + isophthalic acid;
(iii) 60 mole % of isophthalic acid based on the total terephthalic acid + isophthalic acid; and
(iv) 15% by weight of diethylene glycol based on the copolyester.

Reference (b2):

This material, marketed under the trademark Gerol PS 20 80/20 was a copolyester containing:
(i) 15 mole % of 5-sulfoisophthalic acid based on the total acids;
(ii) 80 mole % of terephthalic acid based on the total terephthalic acid+isophthalic acid;
(iii) 20 mole % of isophthalic acid based on the total terephthalic acid+isophthalic acid; and
(iv) 15% by weight of diethylene glycol based on the copolyester.

(3) Orcanophilic polyesters (c):

Reference (c1):
This was a copolyester marketed by Kodak under the trademark Kodar PETG, of the terephthalic acid/ethylene glycol/cyclohexanedimethanol type, which had a solubility volume of 2.69 $(cal/cm^3)_{3/2}$.

Reference (c2):
This was a copolyester marketed by Dynamit Nobel under the trademark Dynapol L 206 of the terephthalic acid/isophthalic acid/ethylene glycol/neopentyl glycol type. This copolyester was soluble in trichloroethylene and methyl ethyl ketone.

The composite films were prepared by coextrusion of a film of polyester (a) and of the mixture a/b/c. The principal line for the extrusion of the layer (A) was operated at 275° C. and the satellite line for the extrusion of the layer (B) at a temperature below 275° C.

The mixtures of polyesters a/b/c were produced in the following manner: the polyesters employed as the constituent of the layer (A) and as component (a) of the ternary mixture were dried at 160° C. to remove all traces of moisture. The polyesters (b) and (c) were stored under dry air. The three components, in particulate form, were stored and fed in the selected proportions, under an inert gas atmosphere, into the screw extruder of the satellite extrusion line.

EXAMPLE 1

A composite film having 3 layers B/A/B, with a total thickness of 40 micrometers, was prepared by coextrusion; the layers (B) were identical and each had a thickness of 1 micrometer. The layer (A) was an unfilled polyethylene terephthalate (a1). The filled layers (B) consisted of the following mixture:
(i) 50% by weight of polyester (a2) consisting of the polyester (a1) containing 0.4% by weight of kaolinite particles which have a median diameter of 1.1 micrometer;
(ii) 25% by weight of reference copolyester (b2); and
(iii) 25% by weight of reference copolyester (c1).

After being subjected to the adhesion tests described above, the composite film received the following overall scores or ratings:

| Tests | Overall score |
|---|---|
| 3 | 10 |
| 8 | 10 |
| 10 | 10 |

EXAMPLES 2 to 6

Following the procedure of Example 1, various composite films having the following characteristics were prepared:
Thickness of the outer layers (B): 1 micrometer;
Layer (A): reference polyester (a1), unfilled;
Total thickness: 50 micrometers.

| Example | Weight proportion of the polymers in the layer (B) | | | Quantity of filler present in the crystalline polyester of the layer (B) |
|---|---|---|---|---|
| | % | % | % | |
| 2 | a2 40 | b2 40 | c1 20 | 3500 ppm of kaolinite median diameter: 1.1 micron |
| 3 | a2 50 | b2 25 | c1 25 | 3500 ppm of kaolinite median diameter: 1.1 micron |
| 4 | a2 40 | b2 40 | c2 20 | 3500 ppm of kaolinite median diameter: 1.1 micron |
| 5 | a2 40 | b2 20 | c2 40 | 3500 ppm of kaolinite median diameter: 1.1 micron |
| 6 | a1 50 | b1 25 | c1 25 | |

The films had the following properties:

| Example | Coefficient of friction | | Score in the adhesion tests | | |
|---|---|---|---|---|---|
| | s | d | test 3 | test 8 | test 10 |
| 2 | 0.61 | 0.53 | 10 | 10 | 8 |
| 3 | 0.43 | 0.30 | 10 | 8 | 9 |
| 4 | 0.77 | 0.47 | 10 | 10 | 9 |
| 5 | 0.56 | 0.45 | 8 | 10 | 9 |
| 6 | | | 10 | 8 | 8 |

These films exhibited satisfactory adhesion properties and good machinability.

EXAMPLE 7

Following the procedure of Example 1, a composite film was prepared which was similar, but in which the layer (B) consisted of the following ternary mixture:

| | Reference polymer | Relative proportions, % by weight |
|---|---|---|
| Crystalline or semi-crystalline polyester | a1 | 70 |
| Water-sensitive copolyester | b2 | 15 |
| Copolyester sensitive to organic solvents | c1 | 15 |

The composite film did not give a satisfactory result in test 8, but gave satisfactory results in tests 3 and 10.

EXAMPLE 8

Following the procedure of Example 4, a composite film was prepared which was similar, but in which the layer (B) consisted of the following mixture:

| | Reference polymer | Relative proportions, % by weight |
|---|---|---|
| Crystalline or semi-crystalline polyester | a1 | 70 |
| Water-sensitive copolyester | b2 | 15 |
| Copolyester sensitive to organic solvents | c2 | 15 |

The composite film did not give a satisfactory result in test 8, but gave satisfactory results in tests 3 and 10.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An oriented composite polyester film member adapted for adhering an end application topcoating thereon, which comprises an extruded orientated base film substrate (A) comprising a crystalline or semicrystalline polyester, said base film substrate (A) bearing an adhesion primer coating (B) coextruded with the substrate (A) on at least one of the face surfaces thereof, said adhesion primer coating (B) comprising a ternary mixture of:
   (a) a crystalline, semicrystalline or crystallizable polyester;
   (b) a water-sensitive copolyester; and
   (c) an organic solvent-sensitive polyester or copolyester.

2. The oriented composite polyester film as defined by claim 1, wherein the polyesters comprising said base film substrate (A) and the component (a) of the ternary mixture are insensitive to ester, ketone and halogenated hydrocarbon organic solvents.

3. The oriented composite polyester film as defined by claim 1, wherein the polyesters comprising said base film substrate (A) and the component (a) of the ternary mixture have a solubility volume below $10^{-2}$ $(cal/cm^3)^{3/2}$.

4. The oriented composite polyester film as defined by claim 1, wherein the polyesters comprising said base film substrate (A) and the component (a) of the ternary mixture comprise a homopolyester or a copolyester of terephthalic acid containing at least 80 mole % of terephthalate recurring units.

5. The oriented composite polyester film as defined by claim 4, wherein the polyesters comprising said base film substrate (A) and the component (a) of the ternary mixture comprise polyethylene terephthalate.

6. The oriented composite polyester film as defined by claim 1, wherein the copolyester of component (b) of the ternary mixture comprises a plurality of hydrophilic groups of the general formula:

$$(-SO_3)_nM \quad (I)$$

in which n is 1 or 2, and M is a hydrogen atom, an alkali metal, an alkaline earth metal, an ammonium cation, or a quaternary ammonium cation.

7. The oriented composite polyester film as defined by claim 6, wherein the water-sensitive copolyester of component (b) of the ternary mixture comprises a plurality of recurring units derived from aromatic diacids or derivatives thereof having the formula:

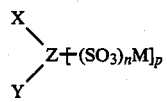

$$\begin{array}{c} X \\ \phantom{X}\diagdown \\ \phantom{XX}Z{+}(SO_3)_nM]_p \\ \phantom{X}\diagup \\ Y \end{array} \quad (II)$$

in which n is 1 or 2, M is a hydrogen atom, an alkali metal, an alkaline earth metal, an ammonium cation, or a quaternary ammonium cation, Z is a polyvalent aromatic radical, X and Y are hydrocarbon radicals, esters of lower aliphatic alcohols, or acid halides, and p is an integer equal to 1 or 2.

8. The oriented composite polyester film as defined by claim 7, wherein the water-sensitive copolyester of component (b) of the ternary mixture comprises a plurality of recurring units of hydroxysulfonylisophthalic acid.

9. The oriented composite polyester film as defined by claim 8, wherein the water-sensitive copolyester of component (b) of the ternary mixture additionally comprises a plurality of recurring units of terephthalic acid.

10. The oriented composite polyester film as defined by claim 9, wherein the water-sensitive copolyester of component (b) of the ternary mixture comprises both a plurality of recurring units of terephthalic acid and a plurality of recurring units of isophthalic acid.

11. The oriented composite polyester film as defined by claim 10, wherein the number of recurring units of isophthalic acid in the water-sensitive copolyester constitutes up to 70% of the total amount of the terephthalate/isophthalate recurring units 12. The oriented composite polyester film as defined by claim 10, wherein the water-sensitive copolyester of component (b) of the ternary mixture comprises a plurality of recurring units of ethylene glycol and/or oligomers thereof having the formula $HO-(CH_2-CH_2-O)_m-H$, in which m is an integer of from 2 to 10.

13. The oriented composite polyester film as defined by claim 12, wherein the amount by weight of recurring units of ethylene glycol oligomers in the water-sensitive copolyester range from 2% to 30%.

14. The oriented composite polyester film as defined by claim 10, wherein the amount of oxysulfonyl group recurring units in the water-sensitive copolyesters, based on the total amount of recurring units of like nature, ranges from 5% to 20%.

15. The oriented composite polyester film as defined by claim 10, wherein the water-sensitive copolyester of component (b) of the ternary mixture comprises from 5 to 20 mole % of recurring units of 5-sulfoisophthalic acid, based on the total amount of recurring units of dicarboxylic acids.

16. The oriented composite polyester film as defined by claim 1, wherein the organic solvent-sensitive polyester of component (c) of the ternary mixture has a solubility volume greater than $10^{-2}$ $(cal/cm^3)^{3/2}$.

17. The oriented composite polyester film as defined by claim 16, wherein the organic solvent-sensitive polyester of component (c) of the ternary mixture has a solubility volume greater than $10^{-2}$ $(cal/cm^3)^{3/2}$ and is not crystallizable.

18. The oriented composite polyester film as defined by claim 17, wherein the organic solvent-sensitive polyester of component (c) of the ternary mixture has a solubility volume greater than $10^{-2}$ $(cal/cm^3)^{3/2}$ and comprises a copolyester of terephthalic acid, ethylene glycol and oligomers thereof, and further comprises a plurality of recurring units of isophthalic acid and/or aliphatic dicarboxylic acids and/or alkylene diols containing at least 3 carbon atoms.

19. The oriented composite polyester film as defined by claim 18, wherein the organic solvent-sensitive polyester of component (c) of the ternary mixture has a solubility volume greater than $10^{-2}$ $(cal/cm^3)^{3/2}$ and comprises a noncrystallizable copolyester containing a plurality of recurring units of terephthalic acid, isophthalic acid, ethylene glycol and neopentyl glycol.

20. The oriented composite polyester film as defined by claim 18, wherein the organic solvent-sensitive polyester of component (c) of the ternary mixture has a solubility volume greater than $10^{-2}$ $(cal/cm^3)^{3/2}$ and comprises a noncrystallizable copolyester containing a plurality of recurring units of terephthalic acid, ethylene glycol and bishydroxymethylcyclohexane.

21. The oriented composite polyester film as defined by claim 1, wherein said ternary mixture comprises:
(a) from 30 to 65% by weight of a crystalline, semicrystalline or crystallizable polyester;
(b) from 15 to 60% by weight of a water-sensitive copolyester; and
(c) from 10 to 55% by weight of an organic solvent-sensitive polyester 22. The oriented composite polyester film as defined by claim 1, wherein the thickness of said adhesion primer coating (B) range from 0.3 to 10 micrometers.

23. The oriented composite polyester film as defined by claim 1, wherein at least one adhesion primer coating (B) has an end application topcoating adhered thereto.

24. The oriented composite polyester film as defined by claim 23, said end application topcoating comprising a matte, photosensitive, diazo, magnetic, metallic or print coating.

* * * * *